(12) United States Patent
Hu et al.

(10) Patent No.: US 8,443,238 B2
(45) Date of Patent: May 14, 2013

(54) SYSTEM AND METHOD FOR TESTING HARD DISK PORTS

(75) Inventors: Ming-Xiang Hu, Shenzhen (CN); Ming-Shiu Ou Yang, Tu-Cheng (TW); Jun-Min Chen, Shenzhen (CN); Ge-Xin Zeng, Shenzhen (CN); Shuang Peng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 247 days.

(21) Appl. No.: 13/095,876

(22) Filed: Apr. 28, 2011

(65) Prior Publication Data

US 2011/0302459 A1 Dec. 8, 2011

(30) Foreign Application Priority Data

Jun. 3, 2010 (CN) .......................... 2010 1 0191047

(51) Int. Cl.
*G06F 11/00* (2006.01)
(52) U.S. Cl.
USPC ................................ 714/43; 714/56; 702/118

(58) Field of Classification Search .................... 714/40, 714/42–44, 54, 56, 57, 719, 27; 702/117, 702/118, 120, 121
See application file for complete search history.

(56) References Cited

U.S. PATENT DOCUMENTS

| 4,348,761 | A * | 9/1982 | Berger .......................... 714/718 |
| 5,210,860 | A * | 5/1993 | Pfeffer et al. .................... 714/42 |
| 6,496,900 | B1 * | 12/2002 | McDonald et al. ........... 711/112 |
| 2007/0094558 | A1 * | 4/2007 | Yi et al. ........................ 714/724 |

\* cited by examiner

*Primary Examiner* — Scott Baderman
*Assistant Examiner* — Joseph Kudirka
(74) *Attorney, Agent, or Firm* — Altis Law Group, Inc.

(57) ABSTRACT

A method tests hard disk ports located on a motherboard of a computing device. Each of the hard disk ports connects to a respective serial port of a test fixture. The test fixture includes a group of serial ports, a multiplexer and a storage device. Each of the hard disk ports is selected to be tested during the process of hard disk ports test. A data transmission path is formed by building a connection between the storage device and a channel of the multiplexer corresponding to the hard disk port. Data are written to the storage device and read from the storage device through the data transmission path. The hard disk port is working normal if the written data are identical to the read data. The hard disk port is not working normally if the written data are not identical to the read data.

16 Claims, 4 Drawing Sheets

SYSTEM AND METHOD FOR TESTING HARD DISK PORTS

BACKGROUND

1. Technical Field

Embodiments of the present disclosure relate generally to I/O port testing, and more particularly, to a system and method for testing hard disk ports on a motherboard of a computing device.

2. Description of Related Art

Generally speaking, most motherboards of computing devices have a plurality of serial advanced technology attachment (SATA) and/or serial attached SCSI (SAS) hard disk ports for communicating with hard disks. After motherboards are assembled, manufacturers need to test the hard disk ports. In some test methods, operators may connect a hard disk to each of the hard disk ports, and then manually test whether each of the hard disk ports works, which is time-consuming, especially if there are many hard disks. Accordingly, such test methods are inconvenient and inefficient.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
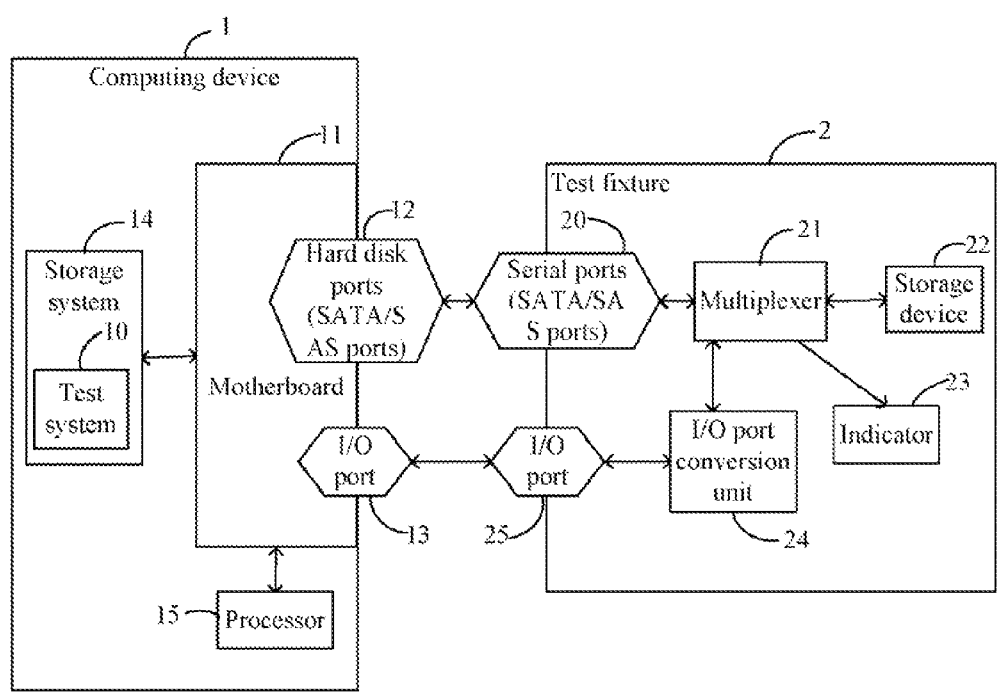
FIG. 1 is a block diagram of one embodiment of a computing device including a test system for testing hard disk ports on a motherboard connected to a test fixture.
Figure 2:
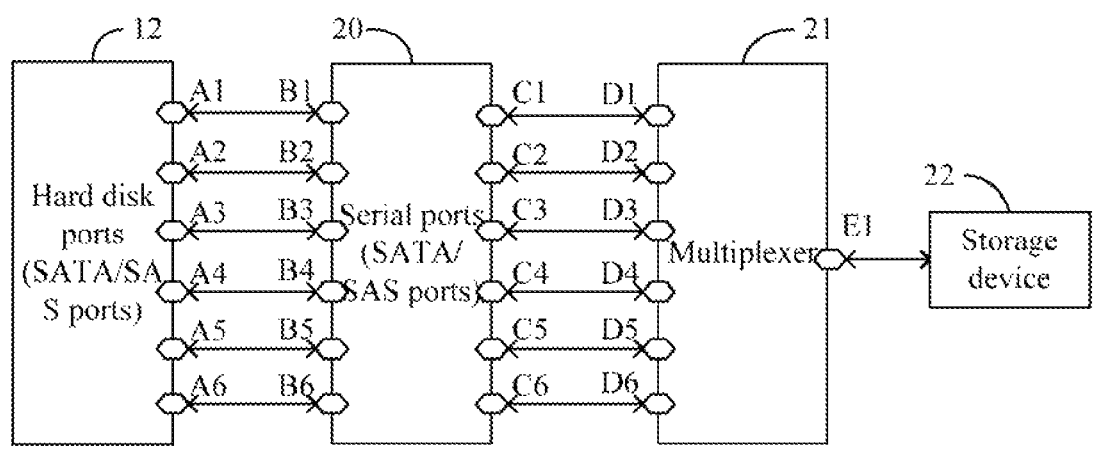
FIG. 2 is a schematic diagram of the test fixture connected to the computing device of FIG. 1.

FIG. 1 is a block diagram of one embodiment of a computing device 1 including a test system 10. In the embodiment, the computing device 1 includes a motherboard 11, a storage system 14, and at least one processor 15. The test system 10 can test hard disk ports on the motherboard 11 of the computing device 1. The motherboard 11 includes a group of hard disk ports (e.g., six SATA/SAS ports are shown in FIG. 2) 12 and an external I/O port 13, wherein the hard disk ports 12 are uniquely labeled, such as A1, A2 and so on. The motherboard 11 electronically connects to a test fixture 2. In one embodiment, the computing device 1 may be a desktop computer, a notebook computer, a server, or a workstation, for example. It should be apparent that FIG. 1 is only one example of the computing device 1 that can be included with more or fewer components than shown in other embodiments, or a different configuration of the various components.

In one embodiment, the test fixture 2 includes a group of serial ports (e.g., six SATA/SAS ports are shown in FIG. 2) 20, a multiplexer 21, a storage device 22, one or more indicators 23, an I/O port conversion unit 24, and an external I/O port 25, wherein the serial ports 20 are also uniquely labeled, such as B1, B2 and so on. The multiplexer 21 may electronically connect to the storage device 22. The multiplexer 21 drives the one or more indicators 23 to indicate test results. The channels of the multiplexer 21 can be customized according to the amount of the hard disk ports 12, and the channels are also uniquely labeled, such as D1, D2 and so on.

FIG. 2 is a schematic diagram illustrating connections of the test fixture 2 to the computing device 1 of FIG. 1. Each of the ports 12 (e.g., six SATA/SAS ports are shown in FIG. 2) connects to a respective serial port 20 (e.g., six SATA/SAS ports are shown in FIG. 2) of the test fixture 2 according to the port name. For example, the port A1 of the hard disk ports 12 connects to the port B1 of the serial ports 20, the port A2 of the hard disk ports 12 connects to the ports B2 of the serial ports 20, and so on. Additionally, each of the serial ports 20 connects to a respective channel of the multiplexer 21 (e.g., six channels are shown in FIG. 2). For example, the port C1 of the serial ports 20 connects to the channel D1 of the multiplexer 21, the port C2 of the serial ports 20 connects to the channel D2 of the multiplexer 21, and so on.

Referring to FIG. 1 and FIG. 2, the I/O port 13 electronically connects to the I/O port 25. The test system 10 is operable to select a hard disk port to be tested from the group of the ports 12, and send a port selection message to the multiplexer 21 through the I/O port 13, the I/O port 25, and the I/O port conversion unit 24. The I/O port conversion unit 24 converts the message into a control signal for controlling the multiplexer 21. The control signal may be an Inter-integrated Circuit ($I^2C$) signal or a Serial Peripheral Interface (SPI) signal. The multiplexer 21 switches on a channel corresponding to a port name of the hard disk port according to the port selection. The channel electronically connects to the storage device 22 to form a data transmission path from the motherboard 11 to the storage device 22. The storage device 22 may be a solid state disk or a hard disk drive. The multiplexer 21 further activates the one or more indicators 23 to indicate which port is being tested according to the port selection.

The test system 10 is further operable to send messages to the multiplexer 21 to activate the one or more indicators 23 to indicate test results and whether all the hard disk ports 12 have been tested. The messages are transmitted through the I/O port 13 and the I/O port 25, to the I/O port conversion unit 24. The I/O port conversion unit 24 converts the messages into the corresponding control signal for controlling the multiplexer 21. In one embodiment, the one or more indicators 23 may be a light emitting diode (LED) display. For example, the display displays the name of the port being tested, and if the name is blinking then it is indicated that the port is not operating correctly, and if the name is not blinking, the port works. A symbol, such as "⌊", can be displayed once all the hard disk ports 12 have been tested.

The storage system 14 stores one or more programs, such as an operating system, and other applications of the computing device 1. In one embodiment, the storage system 14 may be random access memory (RAM) for temporary storage of information, and/or a read only memory (ROM) for permanent storage of information. In other embodiments, the storage system 14 may also be an external storage device, such as a hard disk, a storage card, or a data storage medium. The at least one processor 15 executes computerized operations of the computing device 1 and other applications, to provide functions of the computing device 1.

Figure 3:
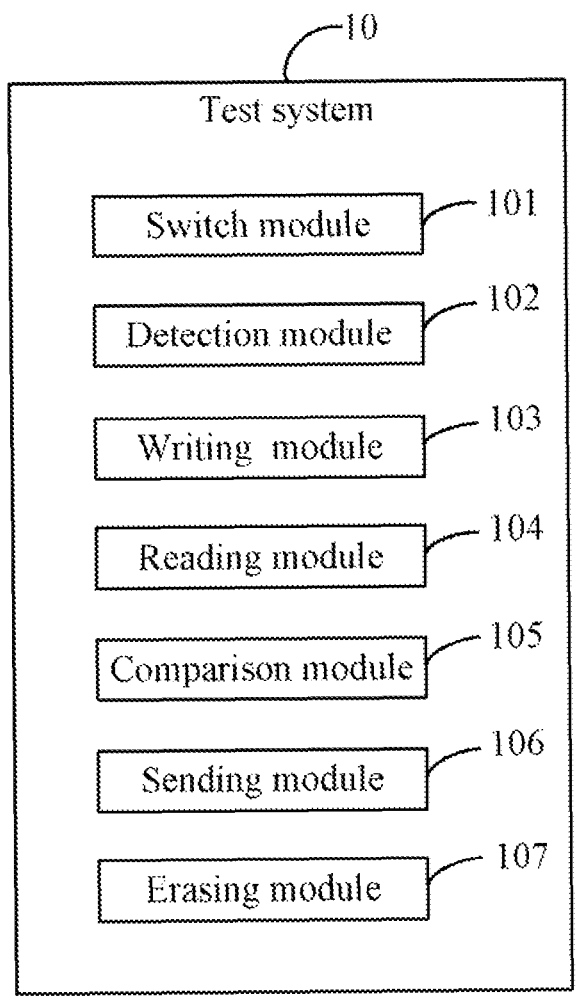
FIG. 3 is a block diagram of one embodiment of functional modules of the test system included in the computing device of FIG. 1.

FIG. 3 is a block diagram of one embodiment of functional modules of the test system 10 of FIG. 1. The test system 10 may include a plurality of functional modules comprising one or more computerized instructions that are stored in the storage system 14 or a computer-readable medium of the computing device 1, and executed by the at least one processor 15 to perform operations of the computing device 1. In one embodiment, the test system 10 includes a switch module 101, a detection module 102, a writing module 103, a reading module 104, a comparison module 105, a sending module 106, and an erasing module 107. In general, the word "module", as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of computer-readable medium or other storage device.

The switch module 101 is operable to select a hard disk port to be tested from the ports 12, and send a port selection message to the multiplexer 21 through the I/O port 13, the I/O port 25, and the I/O port conversion unit. The multiplexer 21 switches on a channel corresponding to a port name of the selected hard disk port according to the port selection. The channel electronically connects to the storage device 22 to form a data transmission path from the motherboard 11 to the storage device 22.

The detection module 102 is operable to detect whether the storage device 22 connects to the multiplexer 21 via the data transmission path. In one embodiment, the computing device 1 indicates that a removable disk (i.e., the storage device 22) is connected to the computing device 1, and the multiplexer 21 activates the one or more indicators 23 to display the name of the hard disk port being tested when the storage device 22 connects to the multiplexer 21. When the storage device 22 fails to connect to the multiplexer 21, a communication between the storage device 22 and the multiplexer 21 can not be established.

The writing module 103 is operable to write data to the storage device 22 through the data transmission path. The data are transmitted to the storage device 22 through the selected hard disk port of the ports 12, the corresponding serial port of the serial ports 20, and the corresponding channel of the multiplexer 21.

The reading module 104 is operable to read data from the storage device 22 through the data transmission path.

The comparison module 105 is operable to compare the written data with the read data.

The sending module 106 is operable to send a result message to the multiplexer 21 to activate the one or more indicators 23 to display test results. In one embodiment, the sending module 106 sends a failure message to the multiplexer 21 to activate the one or more indicators 23 to indicate the hard disk port is not working normally, upon the condition that the written data are not identical to the read data. The sending module 106 sends a pass message to the multiplexer 21 to activate the one or more indicators 23 to indicate the hard disk port is working normally, upon the condition that the written data are identical to the read data. The sending module 106 sends a completed message to the multiplexer 21 to activate the one or more indicators 23 to indicate all the hard disk ports 12 have been tested, upon the condition that all the hard disk ports 12 have been selected by the switch module 101.

The erasing module 107 is operable to erase the written data from the storage device 22, upon the condition that the written data are identical to the read data.

Figure 4:
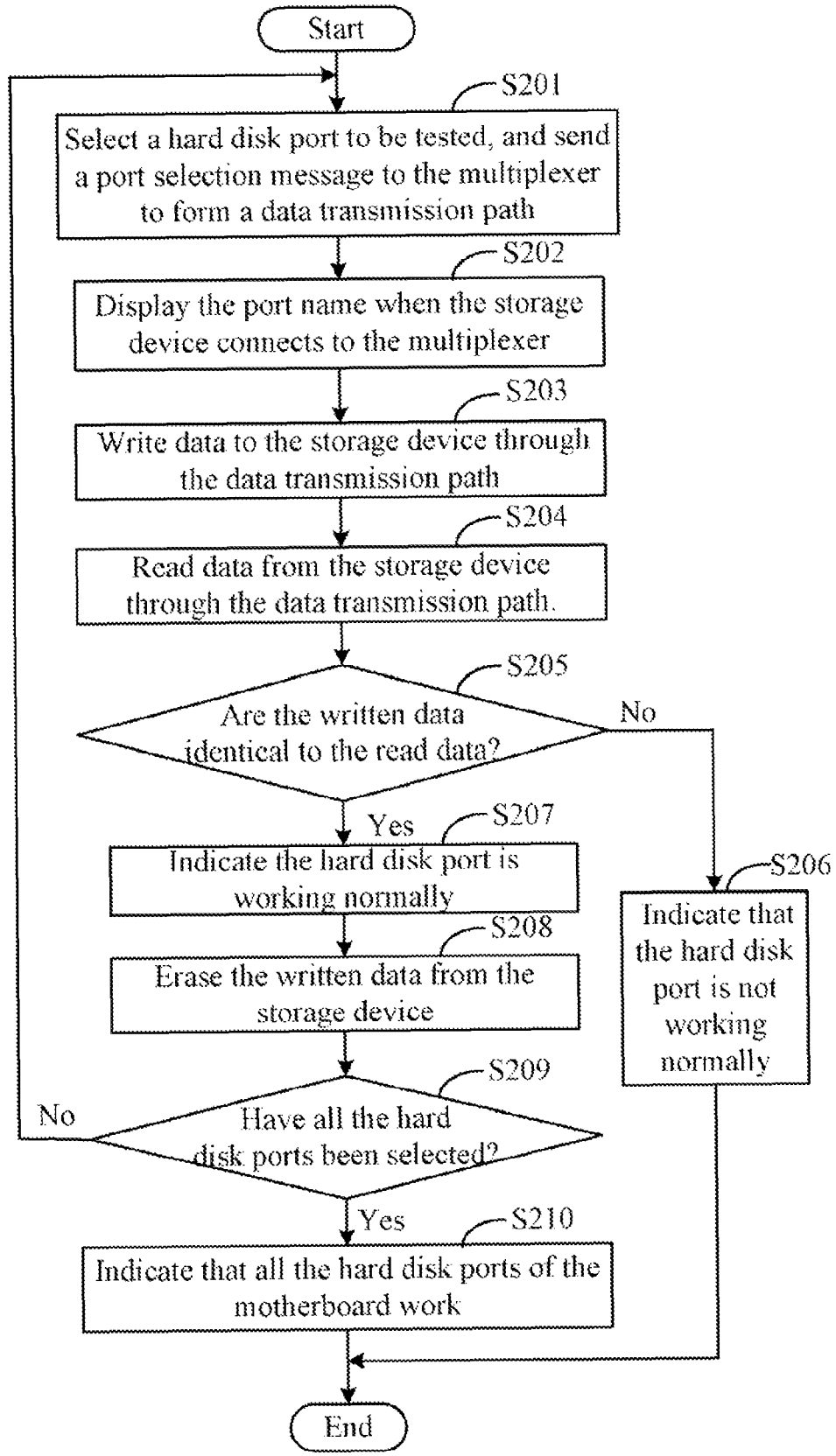
FIG. 4 is a flowchart of one embodiment of a method for testing hard disk ports on a motherboard of the computing device of FIG. 1.

FIG. 4 is a flowchart of one embodiment of a method for testing hard disk ports on a motherboard of the computing device of FIG. 1. Depending on the embodiment, additional blocks may be added, others removed, and the ordering of the blocks, may be changed.

In block S201, the switch module 101 selects a hard disk port to be tested from the group of the ports 12, and sends a port selection message to the multiplexer 21. The multiplexer 21 switches on a channel corresponding to a port name of the selected hard disk port according to the port selection. The channel electronically connects to the storage device 22 to form a data transmission path from the motherboard 11 to the storage device 22.

In block S202, the multiplexer 21 activates the one or more indicators 23 to display a port name of the hard disk port being tested when the detection module 102 detects the storage device 22 connects to the multiplexer 21.

In block S203, the writing module 103 writes data to the storage device 22 through the data transmission path. The data are transmitted to the storage device 22 through the selected hard disk port of the ports 12, the corresponding serial port of the serial ports 20, and the corresponding channel of the multiplexer 21.

In block S204, the reading module 104 reads data from the storage device 22 through the data transmission path.

In block S205, the comparison module 105 compares the written data with the read data. If the written data are not identical to the read data, block S206 is implemented. If the written data are identical to the read data, block S207 is implemented.

In block S206, the sending module 106 sends a failure message to the multiplexer 21 to activate the one or more indicators 23 to indicate that the hard disk port is not working normally.

In block S207, the sending module 106 sends a pass message to the multiplexer 21 to activate the one or more indicators 23 to indicate the hard disk port is working normally.

In block S208, the erasing module 107 erases the written data from the storage device 22.

In block S209, the switch module 101 determines whether all the hard disk ports 12 have been selected. If there are any hard disk ports 12 have not been selected, the flow may return to block S201. If there is no hard disk port 12 to be tested, block S210 is implemented.

In block S210, the sending module 106 sends a completed message to the multiplexer 21 to activate the one or more indicators 23 to indicate all the hard disk ports 12 have been tested, and indicate that the hard disk ports 12 on the motherboard 11 work.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
   a storage system;
   at least one processor;
   a plurality of hard disk ports that are located on a motherboard of the computing device, each of the hard disk ports electronically connecting to a respective serial port of a test fixture, the test fixture comprising a group of serial ports, a multiplexer, a storage device, and one or more indicators; and
   one or more programs stored in the storage system and executable by the at least one processor, the one or more programs comprising:
   a switch module operable to select a hard disk port from the hard disk ports as a hard disk port under test, and send a port selection message to the multiplexer to form a data transmission path by building a connection between the storage device and a channel of the multiplexer corresponding to the hard disk port under test;
   a writing module operable to write data to the storage device through the data transmission path;

a reading module operable to read data from the storage device through the data transmission path;

a comparison module operable to compare the written data with the read data;

a sending module operable to send a failure message to the multiplexer to activate the one or more indicators to indicate that the hard disk port under test is not working normally upon a condition that the written data are not identical to the read data; and an erasing module operable to erase the written data from the storage device upon a condition that the written data are identical to the read data.

2. The computing device of claim 1, wherein the group of hard disk ports and the serial ports are types of serial advanced technology attachment (SATA) or serial attached small computer system interface (SAS) ports.

3. The computing device of claim 1, wherein the multiplexer activates the one or more indicators to display a port name of the hard disk port under test according to the port selection message when the storage device connects to the multiplexer.

4. The computing device of claim 3, wherein the sending module is further operable to send a pass message to the multiplexer to activate the one or more indicators to indicate that the hard disk port under test is working normally upon the condition that the written data are identical to the read data.

5. The computing device of claim 4, wherein the sending module is further operable to send a completed message to the multiplexer to activate the one or more indicators to indicate that all of the hard disk ports have been tested upon a condition that all of the hard disk ports have been selected by the switch module.

6. The computing device of claim 5, wherein the port selection message, the failure message, the pass message, and the completed message are transmitted to the multiplexer through an external input/output (I/O) port of the computing device and an I/O port of the test fixture.

7. A method for testing hard disk ports on a motherboard of a computing device, the method comprising:

(a) selecting a hard disk port from a group of hard disk ports as a hard disk port under test located on the motherboard of the computing device, each of the hard disk ports connecting to a respective serial port of a test fixture, the test fixture comprising a group of serial ports, a multiplexer, a storage device, and one or more indicators;

(b) sending a port selection message to the multiplexer to form a data transmission path by building a connection between the storage device and a channel of the multiplexer corresponding to the hard disk port under test;

(c) writing data to the storage device through the data transmission path;

(d) reading data from the storage device through the data transmission path, and comparing the written data with the read data;

(e) determining that the hard disk port under test is not working normally upon a condition that the written data are not identical to the read data, or determining that the hard disk port under test is working normally and erasing the written data from the storage device upon a condition that the written data are identical to the read data; and (f) repeating block (a) to block (e) until all of the hard disk ports have been selected.

8. The method of claim 7, further comprising:

activating the one or more indicators to display a port name of the hard disk port under test according to the port selection message when the storage device connects to the multiplexer.

9. The method of claim 7, wherein block (e) further comprises:

sending a failure message to the multiplexer to activate the one or more indicators to indicate that the hard disk port under test is not working normally.

10. The method of claim 7, wherein block (e) further comprises:

sending a pass message to the multiplexer to activate the one or more indicators to indicate that the hard disk port under test is working normally.

11. The method of claim 7, wherein block (f) further comprises:

sending a completed message to the multiplexer to activate the one or more indicators to indicate that all of the hard disk ports have been tested.

12. A non-transitory storage medium storing a set of instructions, the set of instructions capable of being executed by a processor of a computing device and causing the computing device to execute a hard disk port test method, the method comprising:

(a) selecting a hard disk port from a group of hard disk ports as a hard disk port under test located on a motherboard of the computing device, each of the hard disk ports connecting to a respective serial port of a test fixture that comprises a group of serial ports, a multiplexer, a storage device, and one or more indicators;

(b) sending a port selection message to the multiplexer to form a data transmission path by building a connection between the storage device and a channel of the multiplexer corresponding to the hard disk port under test;

(c) writing data to the storage device through the data transmission path;

(d) reading data from the storage device through the data transmission path, and comparing the written data with the read data;

(e) determining that the hard disk port under test is not working normally upon a condition that the written data are not identical to the read data, or determining that the hard disk port under test is working normally and erasing the written data from the storage device upon a condition that the written data are identical to the read data; and (f) repeating block (a) to block (e) until all of the hard disk ports have been selected.

13. The medium of claim 12, wherein the method further comprises:

activating the one or more indicators to display a port name of the hard disk port under test according to the port selection message when the storage device connects to the multiplexer.

14. The medium of claim 12, wherein block (e) further comprises:

sending a failure message to the multiplexer to activate the one or more indicators to indicate that the hard disk port under test is not working normally.

15. The medium of claim 12, wherein block (e) further comprises:

sending a pass message to the multiplexer to activate the one or more indicators to indicate that the hard disk port under test is working normally.

16. The medium of claim 12, wherein block (f) further comprises:
sending a completed message to the multiplexer to activate the one or more indicators to indicate that all of the hard disk ports have been tested.

\* \* \* \* \*